United States Patent
Kruse et al.

[15] 3,695,632
[45] Oct. 3, 1972

[54] HOSE COUPLER

[72] Inventors: Frederick V. Kruse, Kilbourne; James D. Pichon, Havana, both of Ill.

[73] Assignee: Ag-Rain, Inc., Havana, Ill.

[22] Filed: June 11, 1970

[21] Appl. No.: 45,336

[52] U.S. Cl. ..................285/5, 285/39, 285/252, 285/255, 285/259
[51] Int. Cl. ............................................F16l 33/20
[58] Field of Search..........285/5, 332, 242, 247, 255, 285/DIG. 4, 243, 252, 253, 39, 259; 239/177, 212, 213

[56] References Cited

UNITED STATES PATENTS

| | | | |
|---|---|---|---|
| 935,971 | 10/1909 | Haas | 285/DIG. 4 |
| 1,233,401 | 7/1917 | Reeve | 285/247 |
| 2,652,282 | 9/1953 | Willetts | 239/213 X |
| 2,746,772 | 5/1956 | Race, Jr. et al. | 285/5 |
| 3,348,863 | 10/1967 | Rinker | 285/255 X |
| 1,491,892 | 4/1924 | Weis et al. | 285/255 X |
| 1,852,962 | 4/1932 | Farr | 285/253 X |

FOREIGN PATENTS OR APPLICATIONS

| | | | |
|---|---|---|---|
| 37,095 | 6/1930 | France | 285/255 |
| 363,207 | 8/1962 | Switzerland | 285/242 |

*Primary Examiner*—David J. Williamowsky
*Assistant Examiner*—David H. Corbin
*Attorney*—Low & Matthews

[57] ABSTRACT

A hose coupler wherein the end of a hose member is slit longitudinally in a plurality of locations in order to permit it to be flared over a frusto-conical surface of a male coupling member. The latter is also provided with a roughened exterior surface in order to help prevent the slit end of the hose member from slipping off the frusto-conical surface. The male coupler member is provided with a substantially cylindrical surface region wherein a watertight seal is effected between the flexible hose member and the coupler. A female coupling member is provided with a frusto-conical inner surface so that it may be placed in telescoping relationship with respect to the slit end flexible hose and pulled toward the frusto-conical external surface on the male coupling member to establish a wedge fit therewith. In this manner it is possible to effect a watertight seal at one point and pull the assembly at another point whereby a leak does not develop if the end pull causes physical damage to the inner tube portion of the hose in the area of the hose where pull is effected.

2 Claims, 5 Drawing Figures

INVENTORS
Frederick V. Kruse
James D. Pichon

INVENTORS
Frederick V. Kruse
James D. Pichon

HOSE COUPLER

This invention relates to a hose coupler, and more particularly to a coupler for a flexible hose wherein the end of the hose is slit axially in a plurality of spaced locations in order to effect an assembly with the coupler members whereby the hose may be sealed at one point and pulled at another point.

The present invention is useful in environments such as is disclosed in U.S. Ser. No. 712,241, now U.S. Pat. No. 3,515,350, Kruse et al. entitled WATER IRRIGATION SYSTEM, wherein relatively large diameter flexible hoses supply water under pressure to a mobile sprinkler unit.

The popularity of the hose pulling concept in order to irrigate lands has created a need for a coupling member having the necessary end pull capability without damaging the hose and causing it to leak. Initially, it was customary to apply the end pull to a hose at the same point that the watertight seal was established between the hose members. In establishing a coupling joint, the hose was frequently damaged at the place where the watertight seal was made. Therefore, if the end pull force is transferred to the hose being pulled at the point in which the watertight seal is made, the damaged hose will rupture at this point causing a leak.

The foregoing disadvantages and shortcomings of the prior art are effectively overcome in accordance with the present invention wherein the hose being pulled is clamped and sealed at one point and pulled at another which is longitudinally spaced outboard from the end of the hose being pulled. Therefore, damage to the tube or inner member of the hose at the location of its pull point will not result in a point of leakage. The coupling members themselves are provided with frusto-conical mating external and internal sections in order to define the pull point for the hose being pulled. This point is outboard of the location of the hose being pulled at which the watertight seal is effected between the flexible tubing members. In order to permit the male coupling member to be received within the hose to be pulled, the end of one of the hose members is slit axially in a plurality of locations whereby the slit end may be flared over the frusto-conical external surface of the male coupling member.

The male coupler member is provided with an annular land portion outboard of its substantially frusto-conical external surface portion with the watertight seal between the hosing members being effected in the annular land portion.

It is preferred to utilize a roughened external surface on the male coupling member so as to retain the slit end of the hose being pulled thereon. In addition, the male coupling member in one form of the invention is provided with an external shoulder within which is registered and retained a clamping member by means of which the watertight seal is effected.

In another form of the invention, the annular land portion of the male coupler member is provided with a groove within which an O-ring is disposed in order to effect a watertight seal between the hose members.

The inherent advantages and improvements of the present invention will become more readily apparent upon considering the following detailed description of the invention and by reference to the drawings in which.

Figure 1:
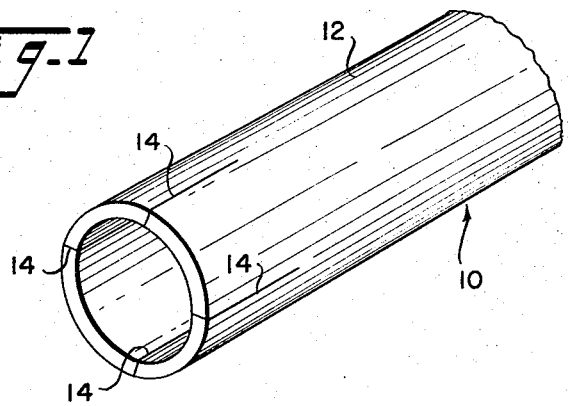
FIG. 1 is a fragmentary perspective view of one hose member.

Referring now to FIG. 1, there is illustrated a flexible tubing member or hose, indicated generally at 10. Hose 10 is shown to have a cylindrical body 12 and a plurality of axially extending slits 14 spaced from each other around its circumference. It is convenient to slit hose 10 in a symmetrical arrangement as shown but this symmetry is not essential.

Figure 2:
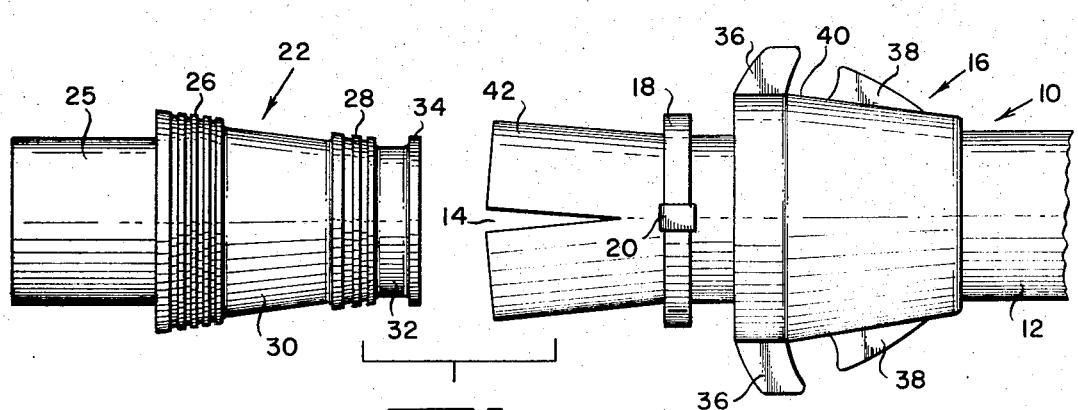
FIG. 2 is a front elevational view showing the position of the hoses and coupler members prior to assembly.

In FIG. 2, hose 10 is shown to have an external or female coupler member, indicated generally at 16, telescopically and slidably received thereon. A band type clamp 18 is also depicted having a buckle or affixing member 20. Clamp 18 is initially placed loosely on hose 10 so as to be slidable thereon.

An internal or male coupler member is designated generally at 22 and cylindrical stem portion 25 is received into a standard female irrigation fitting, not shown, in conventional manner insofar as the present invention is concerned. It is preferred to have a portion of the male coupler member 22 externally roughened. This is illustrated in FIG. 2 by two series of rings designated 26 and 28 which provide a roughened surface for the interior of hose 10 when it is slipped thereover. The roughened surface on male coupler member 22 may take any form for purposes of this invention and may be continuous over the surface 30 which is frusto-conical in cross section. Spaced outboard with respect to the frusto-conical surface 30 and the termination of the roughened surface are 28 is a flat cylindrical surface 32. Spaced further outboard thereof on male coupler 22 is a shoulder or bead 34, the purpose of which is to retain clamp 18 in its final assembled position as will be evident hereinafter.

The female coupler member 16 is provided with a pair of ears 36 to facilitate the pulling of the female coupler member 16 which thereby transmits said pull to the flexible hose because of the wedging action between the frusto-conical interior surface of the female coupler and the frusto-conical external surface 30 of male coupler 22 having roughened portion 26 and 28 thereon. A pair of deflectors 38 are substantially in line with the outwardly extending ears 36 in order to prevent the accumulation of dirt on the ears when the coupler members are dragged along the ground in actual use. The female coupler member 16 has a frusto-conical surface 40 both exterior and interior as is indicated best in FIG. 5 in order to mate with the frusto-conical external surface 30 of the male coupler 22.

Figure 3:
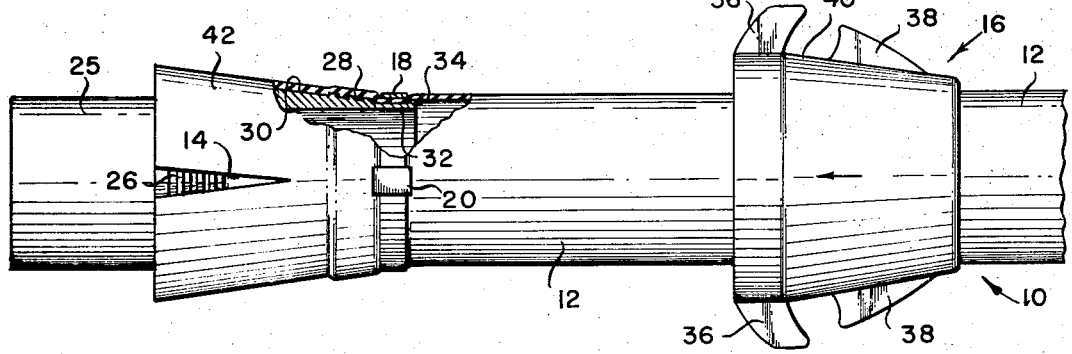
FIG. 3 is a fragmentary front elevational view partially in cross section showing a position of the hose members and coupler members immediately prior to final assembly.
Figure 4:
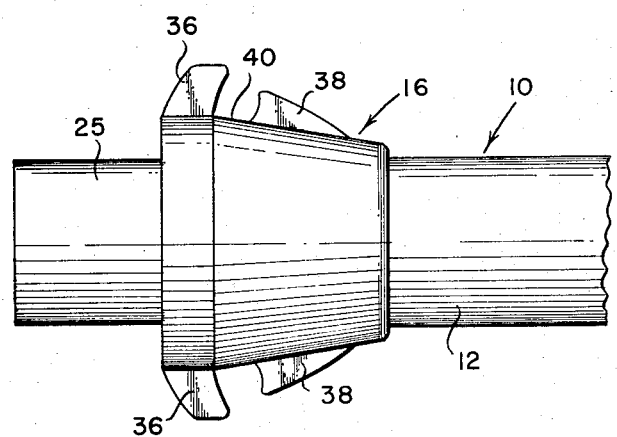
FIG. 4 is a fragmentary front elevational view of the hose and coupler members when completely assembled; and, FIG. 5 is a front elevational view, fragmentary in nature and partially in cross section, illustrating a modified form of the present invention.

Referring to FIG. 3, there is shown a position in the assembly of the coupler wherein male coupler 22 has been inserted into the flared end 42 of hose 10 to such a position wherein the end 42 is substantially coincident with the inboard portion of the roughened surface 26. The band type clamp 18 has been slid to the left in substantial registry with the flat cylindrical surface 32 and pulled tightly in order to establish a watertight seal between the flexible hose member 10 and the male coupler 22. The outboard end of roughened surface 28 and the shoulder or bead 34 combine with the flat cylindrical surface 32 to define a channel within which the band 18 is in registry and which is tightly clamped and retained by the shoulder or bead 34 from being pulled off the end of the male coupler 22. The female coupler 16 is then pulled to the left in FIG. 3 whereby its frusto-conical inner surface engages the frusto-conical external surface 30 of the male coupler 22 so as to wedge or lock the coupler members together through the intermediary of the end 42 of flexible tubing member 10. Chains or the like, not shown, may be used to engage the pairs of ears 36 in order to draw the female coupler member into its final position which is shown in FIG. 4. In this position, the flexible hose member and coupler are in fluid communication with the irrigation fitting, not shown, into which cylindrical stem 25 is received.

Figure 5:
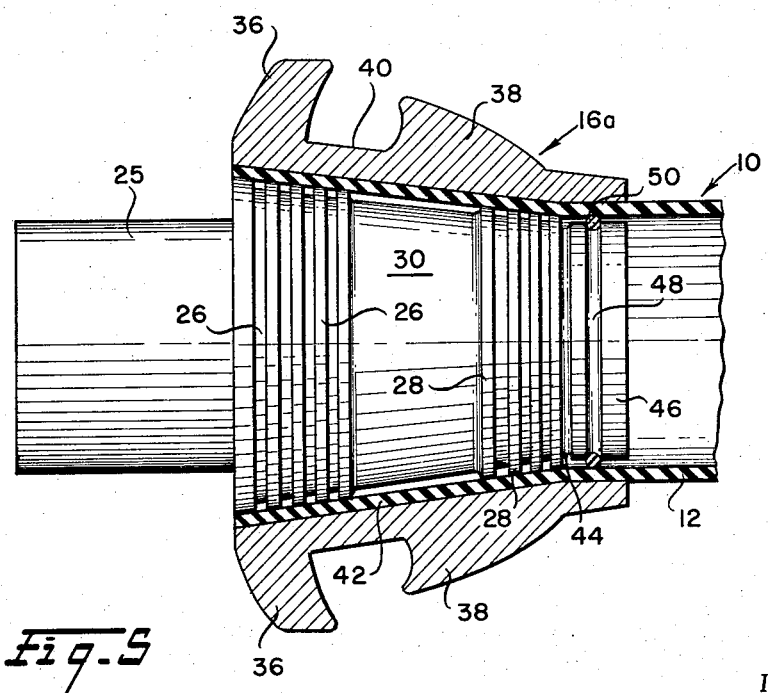

A modified form of the male coupler member is shown in FIG. 5 in the final assembly with a female coupler member 16a which is identical with female coupler 16. In this form, the male coupler member is provided with an undercut groove 44 and a flat annular cylindrical land 46 outboard thereof. While there is no corresponding shoulder or bead 34 utilized in the FIG. 5 embodiment, there is a groove 48 in land 46 which receives an O-ring 50 in order to establish a watertight seal between the flexible hose member and the male coupler.

While the invention is believed to be readily apparent from the foregoing description, the method of assembly will now be explained. The male coupler member 22 has a frusto-conical surface portion 30 and at least one substantially cylindrical portion 32 with the latter being outboard of the frusto-conical portion. The end 42 of a flexible hose member 10 is slit axially in a plurality of spaced locations 14. A female coupler member is telescopically and slidably received on the hose member having the slit end. The male coupler member is then inserted into the slit end of the second flexible tubing member until the slit end thereof overlies at least a portion of the coupler. A watertight seal is then established between the first and second flexible tubing members in the region of the substantially cylindrical external portion of the male coupling member. In the embodiment shown in FIG. 4, this is effected by sliding the clamping member 18 into registry with cylindrical surface portion 32 and tightening clamp 18. In the FIG. 5 embodiment this is accomplished by means of the O-ring 48 which is received on the cylindrical portion 46 and which engages the inside of the flexible hose member. In the next step in each embodiment, the female coupler member is slid toward the male coupler member to establish a wedging or locking relationship between the frusto-conical surfaces of each coupler member. The final assembly consists of placing the cylindrical stem portion 25 into a standard irrigation fitting, not shown, and retaining this relationship with chains or the like, not shown, engaged in the pair of ears 36.

While the invention has been disclosed with the use of four slits in the end of hose 10, the number of slits is a function of the diameter of the hose being slit over the frusto-conical portion of the male coupler member and the invention is not limited to any specific number of slits. If any portion of the hose extends beyond the end of the female coupler body, it may be trimmed off to provide a better appearance.

It is thought that the invention and many of its attendant advantages will be understood from the foregoing description, and it will be apparent that various changes may be made in the form, construction and arrangement of parts without departing from the spirit and scope of the invention, the forms hereinbefore described being merely preferred embodiments thereof.

What is claimed is:

1. In a watertight coupling for a flexible hose capable of imparting high tensile end pull substantially uniformly to said flexible hose, the combination which comprises:
   a. a male coupler member,
   b. said male coupler member being provided with a substantially frusto-conical external surface portion to receive the end of a flexible hose member over at least a portion of said frusto-conical external surface portion,
      1. said male coupler member further being provided with a shoulder at its leading end and a groove inboard of said shoulder,
   c. a female coupler member having a frusto-conical inner surface which overlies said frusto-conical surface of said male coupler member and engages the end of said flexible hose member substantially uniformly around the external periphery thereof,
   d. said frusto-conical surfaces being wedged together but spaced apart through the intermediary of said flexible hose member,
   e. and means separate from said female coupler member for engaging said flexible hose member to establish a watertight seal between said male coupler member and said flexible hose member,
      1. said means for engaging said flexible hose member to establish a watertight seal comprises a clamping member in registry with said groove and retained therein by said shoulder with said hose member being intermediate said clamping member and said groove,
   f. said frusto-conical surfaces of said male and female couplers being wedged together outboard of the locus of said watertight seal whereby damage to said flexible hose member resulting from said wedging action of said coupler members will not cause a leak in said flexible hose member.

2. In a watertight coupling for a flexible hose capable of imparting high tensile end pull substantially uniformly to said flexible hose, the combination which comprises:
   a. a male coupler member,
   b. said male coupler member being provided with a substantially frusto-conical external surface portion to receive the end of a flexible hose member over at least a portion of said frusto-conical external surface portion,
      1. said male coupler member further being provided with a recessed portion adjacent said one end received within said flexible hose member, c. a female coupler member having a frusto-conical inner surface which overlies said frusto-conical surface of said male coupler member and engages the end of said flexible hose member substantially uniformly around the external periphery thereof,
d. said frusto-conical surfaces being wedged together but spaced apart through the intermediary of said flexible hose member,
e. and means separate from said female coupler member for engaging said flexible hose member to establish a watertight seal between said male coupler member and said flexible hose member,
  1. said means for engaging said flexible hose member comprises a flat band tightened in registry with said recessed portion of said male coupler member to be restrained thereby from longitudinal movement with said hose member being intermediate said recessed portion and said flat band clamping member,
f. said frusto-conical surfaces of said male and female couplers being wedged together outboard of the locus of said watertight seal whereby damage to said flexible hose member resulting from said wedging action of said coupler members will not cause a leak in said flexible hose member.

* * * * *